United States Patent [19]

Swan

[11] 3,712,424
[45] Jan. 23, 1973

[54] PARKING BRAKE

[76] Inventor: Alfred H. Swan, P.O. Box 566, Pearblossom, Calif. 93553

[22] Filed: Jan. 15, 1971

[21] Appl. No.: 106,713

[52] U.S. Cl. ..................... 188/74, 188/2 R
[51] Int. Cl. ............................. F16d 49/00
[58] Field of Search .. 188/2 R, 152, 74, 153 R, 153 D

[56] References Cited

UNITED STATES PATENTS 3,548,975  12/1970  Herndon ..................... 188/74

Primary Examiner—Duane A. Reger
Attorney—Lyon & Lyon

[57] ABSTRACT

A parking brake adapted to be placed between tandem wheels of a vehicle such as a camping trailer or a mobile home trailer. The brake comprises a pair of bridging structures extending between the tires of the tandem wheels and a screw shaft connecting the bridging structures to draw the structures toward each other so as to bear against the tires to prevent rotation.

5 Claims, 6 Drawing Figures

PATENTED JAN 23 1973
3,712,424
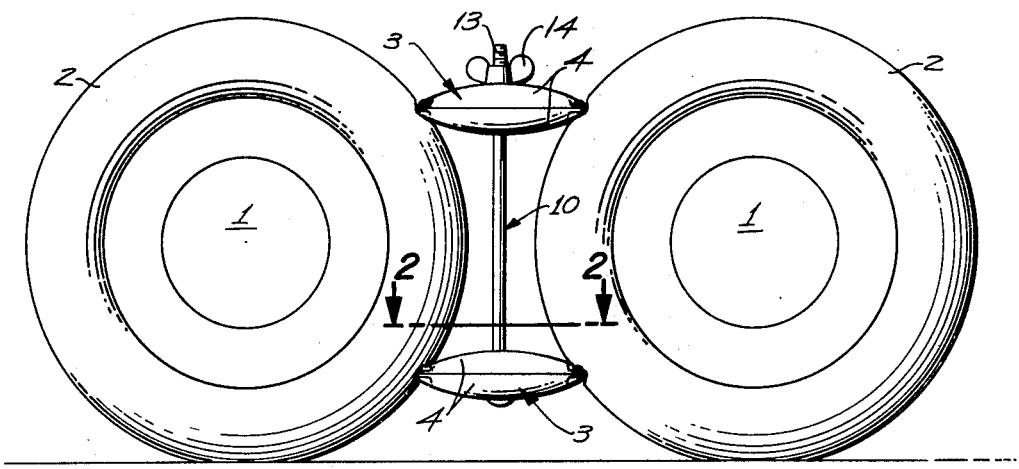
Fig.1
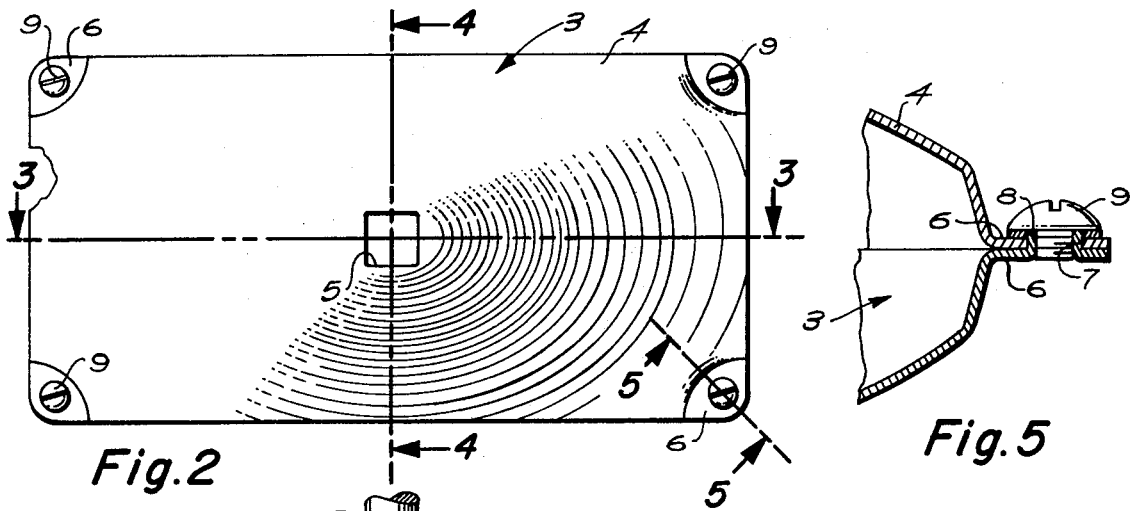
Fig.2
Fig.5
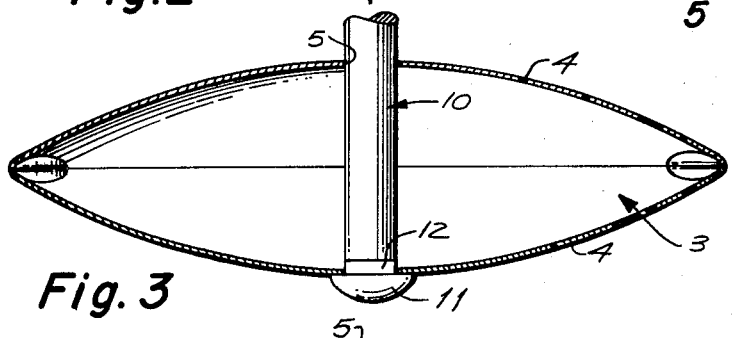
Fig.3
Fig.6
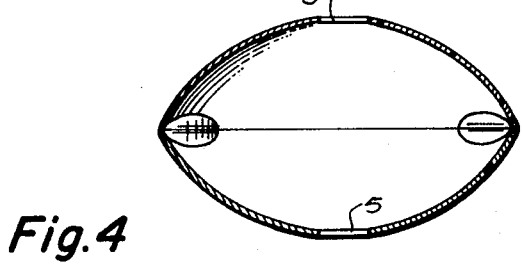
Fig.4
INVENTOR.
ALFRED H. SWAN
BY
Lyon Lyon
ATTORNEYS

PARKING BRAKE

SUMMARY OF THE INVENTION

This invention relates to parking brakes and the invention is summarized in the following objects:

First, to provide a parking brake which is intended primarily for use between tandem disposed wheels of a vehicle such as a camping trailer or mobile home trailer, but may be used between the tandem wheels of trucks.

Second, to provide a parking brake which utilizes a pair of bridging structures extending between the tires, one above and one below the centerline between the axles, and a screw shaft extending vertically between the bridging structures and provided with a wing nut so that the bridging structures may be forced toward each other to press into the tires thereby to secure the tires against rotation.

Third, to provide a parking brake, as indicated in the preceding objects, in which the parts of the bridging structures may be initially stacked in nesting relation to facilitate transportation and storage.

DESCRIPTION OF THE DRAWINGS

FIG. 1 is a fragmentary side view of a vehicle having tandem wheels, and showing the parking brake in position thereon.

FIG. 2 is an enlarged sectional view of the parking brake, taken from 2—2 of FIG. 1.

FIG. 3 is a sectional view thereof, taken through 3—3 of FIG. 2.

FIG. 4 is a sectional view thereof, taken through 4—4 of FIG. 2.

FIG. 5 is a further enlarged sectional view, taken through 5—5 of FIG. 2.

FIG. 6 is a side view of a set of bridging members in a stacked condition for shipping or for storage.

The parking brake is adapted to secure a pair of tandemly disposed vehicle wheels 1, having tires 2. The parking brake is interposed between the tandem wheels and engages the tandem wheels to prevent rotation.

The parking brake includes a pair of bridging structures 3. Each bridging structure includes a pair of rectangular dome-shaped bridging members 4, having central openings 5, which may be square. The bridging members are formed of sheet metal and although dome-shaped, the peripheral margins define a common plane.

The pair of bridging members are positioned with their peripheral edges in mutual engagement and mutually engaging flattened portions 6 are formed at each corner of the pair of bridging members. One half of the flattened corners are provided with perforations 7; the remaining half are provided with integral collars 8 which fit within the perforations 7 and are internally screwthreaded to receive screws 9 so that the pair of bridging members may be joined together.

The pair of bridging structures 3 receive a common shaft 10, having a head 11 at one end. Adjacent the head, the shaft 10 is preferably provided with a square portion 12. The opposite end of the shaft 10 is provided with screw-threads 13 and receives a wing nut 14.

The parking brake is assembled by placing one of the bridging structures 3 adjacent the head 11 and the other at the screwthreaded end 13.

Operation of the parking brake is as follows:

The parking brake is positioned between tandem tires so that one bridging structure 3 extends between and engages the pair of tires below the plane passing through the axes of the two wheels, and the other bridging structure is placed so as to engage the pair of tires at a level above the common plane. The wing nut 14 is then screwed upon the shaft 10, forcing the two bridging structures into firm engagement with the tires.

The domed configuration of the two bridging members forming each bridging structure places the openings 5 at a substantial distance from each other so that the margins of the opening bear against the shaft and prevent tilting movement of the bridging structures relative to the shaft, so as to resist turning movement of the confronting portions of the tires in opposite direction. The shaft 10 is made strong enough to resist any bending movement that might be applied by reason of force exerted on the tires tending to rotate them.

By reason of the fact that the bridging structures are rectangular, the bridging structures may be placed endwise as illustrated to accommodate tires having greater spacing, or may be placed transversely between tires having less spacing.

For purposes of shipping or storing, the bridging members 4 may be stacked, as indicated in FIG. 6.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. A parking brake, for vehicles having tandemly disposed wheels, comprising:
   a. a pair of bridging structures, each including a pair of dome-shaped bridging members having planar edges disposed in contiguous relation and spacing the central portions, the members having aligned centrally disposed openings;
   b. a screwthreaded shaft extending between the bridging structure and through the aligned openings therein, the margins of the aligned openings bearing against the shaft to resist tilting of the bridging structures relative to the shaft;
   c. the bridging structures being dimensioned to bridge between the tires of a pair of tandemly disposed wheels in planes above and below a plane common to the axes of the wheels with their planar edges engaging the tires;
   d. and screwthreaded means on the shaft for forcing the bridging structures toward each other thereby to cause the planar edges of the bridging members to indent into the tires.

2. A parking brake, as defined in claim 1, wherein:
   a. the pairs of bridging structures are similarly domed and separable from each other for stacking engagement;
   b. and separable fastening means join the pairs of bridging members for mounting on the shaft.

3. A parking brake for vehicles having tandemly disposed wheels, comprising:
   a. a pair of bridging members adapted to be disposed in planes above and below a plane common to the axes of the wheels, each bridging member having spaced coplanar tire indenting edges, and centrally disposed shaft guide means perpendicular thereto;
   a shaft slidably received in the guide means and extending therebetween;
   c. and means carried by the shaft and engageable with the remote sides of the guide means for drawing the bridging members toward each other thereby causing the edges thereof to indent into the surfaces of the tires.
4. A parking brake as defined in claim 3, wherein:
a. the shaft guide means restrains the bridging members against angular movement relative to the shaft, thereby to maintain the shaft in perpendicular relation to the bridging members.
5. A parking brake as defined in claim 3, wherein:
a. the bridging members are rectangular in plan, each forming a first pair of edges having greater spacing and a second pair of edges having lesser spacing.

* * * * *